US011922553B1

United States Patent
Liu et al.

(10) Patent No.: US 11,922,553 B1
(45) Date of Patent: Mar. 5, 2024

(54) SYSTEM AND METHOD FOR CONTROLLING EFFECTS ON LIVE VIDEO STREAM AND FOR CONTROLLING ACCESSORIES VIA LIVE VIDEO STREAM INTERFACE

(71) Applicant: HYTTO PTE. LTD., Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/296,823

(22) Filed: Apr. 6, 2023

(51) Int. Cl.
| | |
|---|---|
| *G06T 13/80* | (2011.01) |
| *G06F 3/04817* | (2022.01) |
| *G06F 3/0482* | (2013.01) |
| *G06F 3/0488* | (2022.01) |
| *G06T 13/40* | (2011.01) |

(52) U.S. Cl.
CPC .......... *G06T 13/80* (2013.01); *G06F 3/04817* (2013.01); *G06F 3/0482* (2013.01); *G06F 3/0488* (2013.01); *G06T 13/40* (2013.01); *G06T 2200/24* (2013.01)

(58) Field of Classification Search
CPC ..... G06T 13/80; G06T 13/40; G06T 2200/24; G06T 2207/20221; G06T 2207/20212; G09G 5/377; G09G 2340/12
See application file for complete search history.

(56) References Cited

U.S. PATENT DOCUMENTS

| 6,346,963 | B1 * | 2/2002 | Katsumi | ................ H04N 7/152 |
| | | | | 348/E7.083 |
| 10,999,608 | B2 | 5/2021 | Liu | |
| 2017/0034237 | A1 * | 2/2017 | Silver | .................... H04N 5/272 |
| 2019/0096113 | A1 * | 3/2019 | Stukalov | ................. G06T 11/60 |
| 2019/0108578 | A1 * | 4/2019 | Spivack | ................. G09B 5/065 |
| 2023/0057073 | A1 * | 2/2023 | Walker | ...................... G06T 7/70 |

FOREIGN PATENT DOCUMENTS

CN 107948667 6/2020

OTHER PUBLICATIONS

U.S. Appl. No. 18/048,817 with Drawings Oct. 21, 2022.

* cited by examiner

*Primary Examiner* — Antonio A Caschera
(74) *Attorney, Agent, or Firm* — F. CHAU & ASSOCIATES, LLC

(57) ABSTRACT

A method for controlling effects on a live video stream includes providing a video image from a content creator device and displaying the video image on a first viewer device. A selection of a sticker graphic is received on the first viewer device. A position of a user input operation on the displayed video image is determined. The determined position of the user input operation on the displayed video image is converted to a position of the user input operation on the video image. The selected sticker graphic is applied to the video image at the position of the user input operation on the video image. The applied sticker graphic is displayed along with the video image on at least the first viewer device.

25 Claims, 10 Drawing Sheets

SYSTEM AND METHOD FOR CONTROLLING EFFECTS ON LIVE VIDEO STREAM AND FOR CONTROLLING ACCESSORIES VIA LIVE VIDEO STREAM INTERFACE

TECHNICAL FIELD

The present disclosure relates to live video streaming and, more specifically, to systems and methods for controlling effects on live video streams and for controlling accessories via live video stream.

DISCUSSION OF THE RELATED ART

Live streaming video performances are of increasing popularity world-wide. In these performances, a model may stream a live performance over the Internet to a group of viewers all accessing the video stream at their personal terminals and devices. Unlike traditional means of live broadcast, however, the viewers of the live streaming video performances may be able to interact with the model and one another, for example, by sending text messages, sending tips, and, in some cases, remotely controlling one or more accessories in the possession of the model.

SUMMARY

A method for controlling effects on a live video stream includes providing a video image from a content creator device and displaying the video image on a first viewer device. A selection of a sticker graphic is received on the first viewer device. A position of a user input operation on the displayed video image is determined. The determined position of the user input operation on the displayed video image is converted to a position of the user input operation on the video image. The selected sticker graphic is applied to the video image at the position of the user input operation on the video image. The applied sticker graphic is displayed along with the video image on at least the first viewer device.

A method for controlling accessories within a live video stream includes registering one or more accessories to a content creator device. A live feed video broadcast is initiated to at least one viewer device. The one or more accessories is located within the live feed video broadcast. A control gesture is received from a viewer of the at least one viewer device. A location range of the control gesture on the at least one viewer device is determined. The determined location from the at least one viewer device is converted to a location on the live feed video broadcast. It is determined whether the location of the control gesture on the live feed video broadcast falls within the location range of the one or more accessories within the live feed video broadcast. When it is determined that the location of the control gesture on the live feed video broadcast falls within the location range of the one or more accessories within the live feed video broadcast, an operation of the one or more accessories is controlled in accordance with the touch gesture using information obtained as part of the registration of the one or more accessories.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
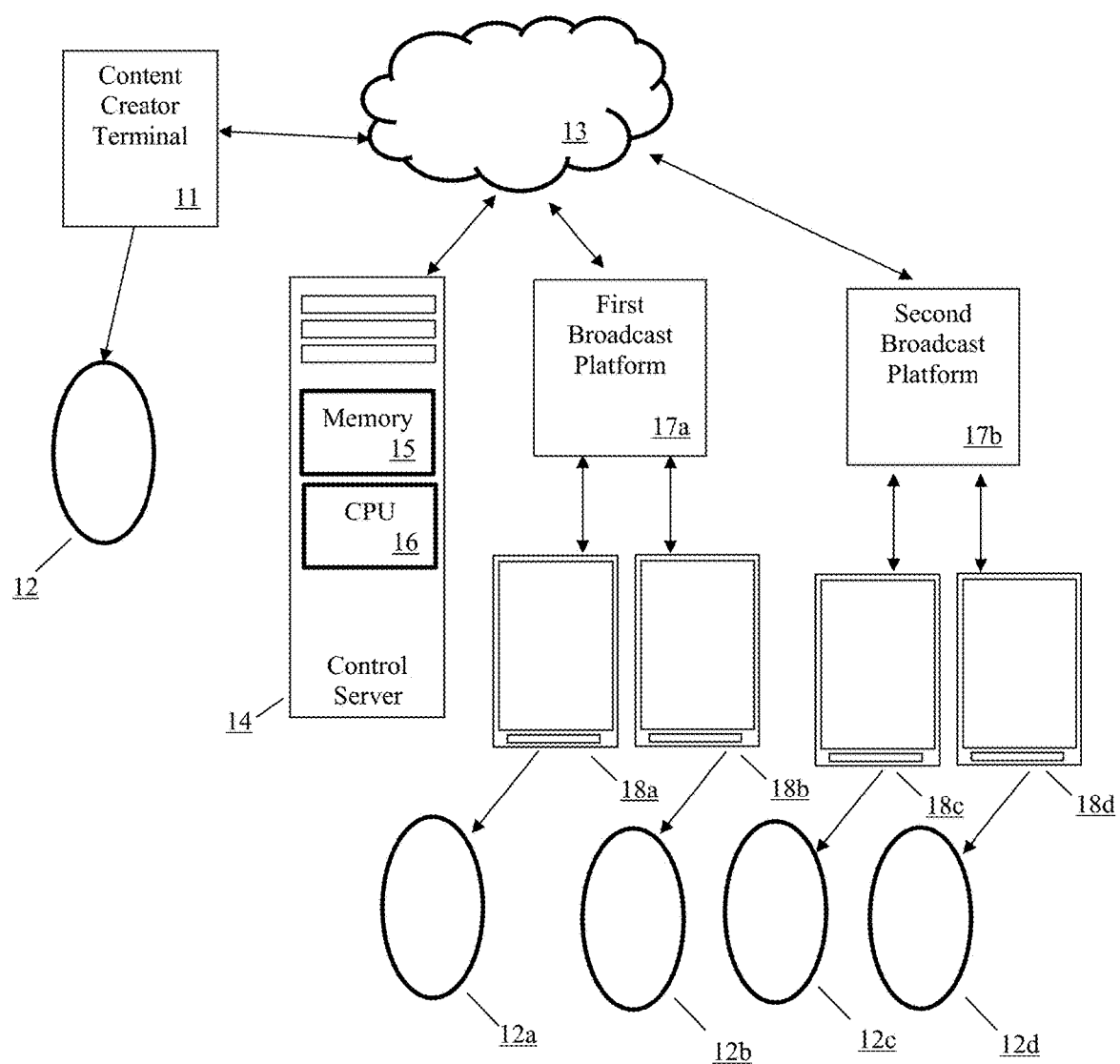
FIG. 1 is a schematic diagram illustrating a system for controlling effects on a live stream broadcast and controlling an accessory appearing within the frame of the live stream broadcast in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present disclosure relate to various methods and systems for allowing for greater engagement of viewers in live stream broadcasts featuring a content creator model using an intuitive user interface. For example, viewers may be able to apply an image or animation (referred to herein as a "sticker") as an overlay to the live stream, for all viewers, by applying that image or animation to their own view of the live stream. This may be done in such a way that the sticker may appear in the same relative location for all live stream viewers as it does for the viewer that is applying the sticker. Moreover, the location of the sticker may be automatically associated with one or more anatomical landmarks of the content creator model such that as she changes location within the frame, the sticker tracks to her for as long as the sticker persists. The sticker may then expire after a particular period of time has elapsed. This tracking may be performed either in 2D, as is the case in which the live stream is recorded monocularly (recorded for viewing with a single image for both eyes, i.e., 2D) or 3D, as is the case in which the live stream is recorded binocularly (recorded for viewing with distinct left-eye and right-eye images, i.e., 3D) with one or more of the live stream viewers watching the live stream using 3D glasses.

Examples of stickers may include an animation of a tongue licking, a whip snapping, wax melting, etc. The appearance of the sticker, the animation effect of the sticker, the duration of the sticker, and various other aspects of the sticker may be customized by the viewer, for example, by utilizing a touch gesture in selecting and/or applying the sticker to the view. Alternatively, the appearance of the sticker may be customized by recording and/or recognizing the motion of a viewer's actual body, such as by capturing an image of or capturing the motion of a bodily gesture of the user, such as a hand gesture, tongue movements, etc. Examples of suitable touch gestures may include a light press, a heavy press, a long press, a short press, a double press, a pinching, a sliding, etc. It is to be further understood that the touch gesture need not be a gesture on a touch screen and can be any user input such as, for example, by touch screen, keyboard, trackpad, trackball, stylus, etc.

For example, voice/image recognizing may be used to perform sticker selection and customization. For example, a start position of a sliding gesture may be used to confirm the sticker selection, an end position of the sliding gesture may be used to confirm a preview position as the first position, a long or short press may be used to confirm the sticker duration, and a sliding direction of the touch gesture may be used to determine a pattern direction for displaying the sticker (e.g., whip left/right, etc.).

As another example, the viewer may be able to exert remote control to one or more electronic devices (referred to herein as "accessories") within the live stream frame simply by tapping or otherwise manipulating the image of device on the viewer's screen, for example, by the press of a finger or click of a mouse/trackpad. The location and manner of this press, relative to the displayed image, may be interpreted as a command to manipulate the operational mode of the accessories, and in some instances, the motion of the manipulation of the viewer's image on his screen may engage a corresponding action on the accessory such that the accessory may move in the direction of the user's press.

FIG. 1 is a schematic diagram illustrating a system for controlling effects on a live stream broadcast and controlling an accessory appearing within the frame of the live stream broadcast in accordance with exemplary embodiments of the present disclosure. The content creator model 12 may operate a content creator terminal 11, examples of which are described in greater detail below. The content creator terminal 11 may record a live stream including video and audio, which is sent over the Internet 13 to one or more live stream broadcast platforms 17*a* and 27*b*. Each broadcast platform 17*a* and 17*b* may establish a live stream broadcast for its respective viewers. For example, a first broadcast platform 17*a* may establish a first live stream that is viewed by a first and second viewer 12*a* and 12*b* using corresponding viewer terminals 18*a* and 18*b*, while a second broadcast platform 17*b* may establish a second live stream that is viewed by a third and fourth viewer 12*c* and 12*d* using corresponding viewer terminals 18*c* and 18*d*.

The content creator model 12 may also make use of an approach for directly influencing and adding functionality to the live streams in a manner that is independent of the broadcast platforms 17*a* and 17*b*. For example, by the use of an application or browser plugin, the content creator terminal 11 may interact with a control server 14 so as to add functionality to the live stream that is accessible to any viewers that are making use of a corresponding application or browser plugin that also connects to the control server 14. In this way, the added functionality may be arranged by a connection between content creator terminal 11 and the viewer terminals 18*a*-18*d* that circumvents the broadcast platforms 17*a* and 17*b* and thereby allows the content creator model 12 to provide a more engaging live stream experience to the viewers 18*a*-18*d* than is offered by the various broadcast platforms 17*a* and 17*b*.

Thus, the above-described functionality of the application of stickers to the live stream and the remote control of accessories by touch may be implemented through the control server 14 functionality, however, it may alternatively be implemented though the broadcast platforms 17*a* and 17*b* themselves.

Figure 2:
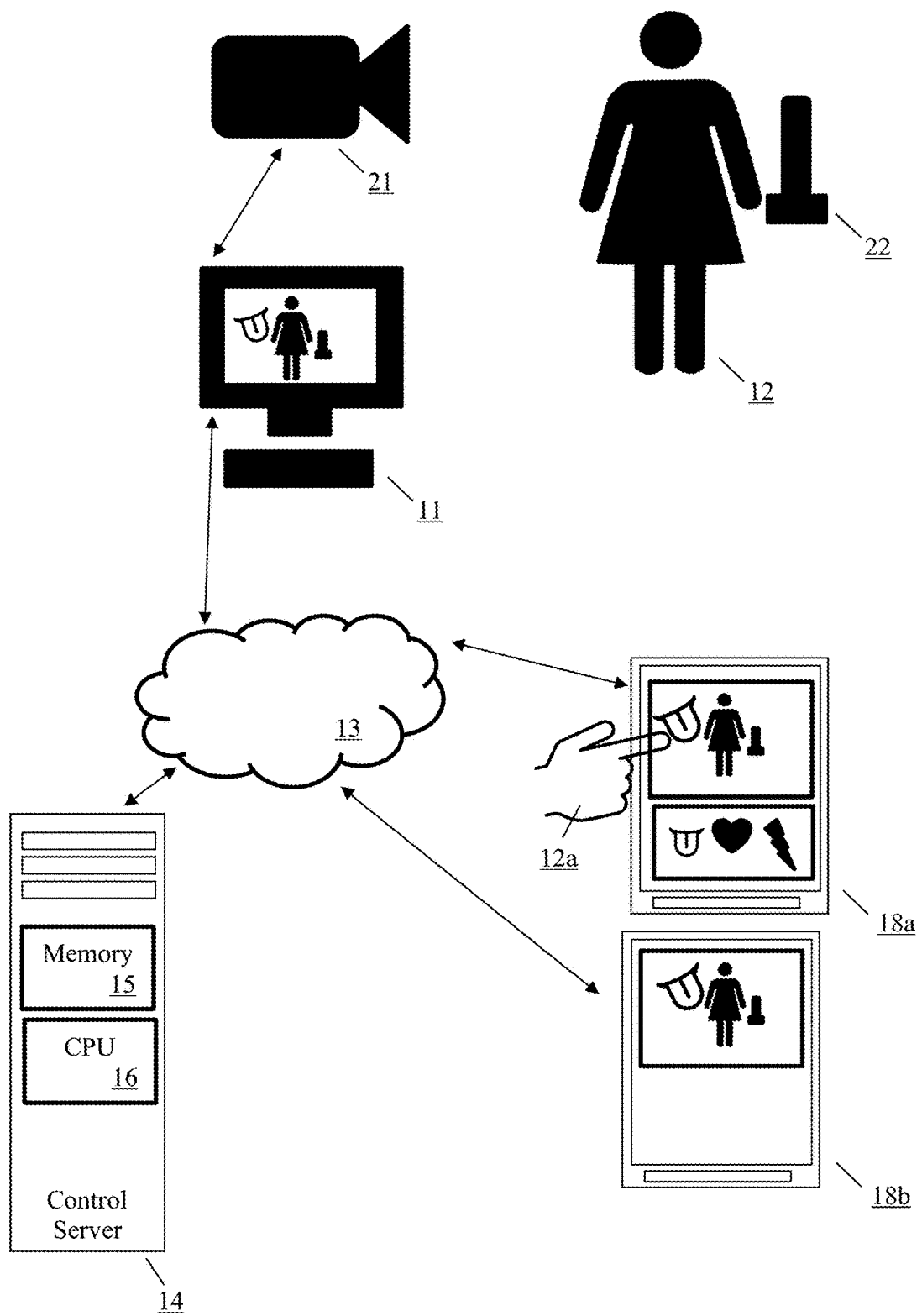
FIG. 2 is a schematic diagram illustrating a system for controlling effects such as the placement of stickers on a live stream broadcast and controlling an accessory appearing within the frame of the live stream broadcast in accordance with exemplary embodiments of the present disclosure.
Figure 4:
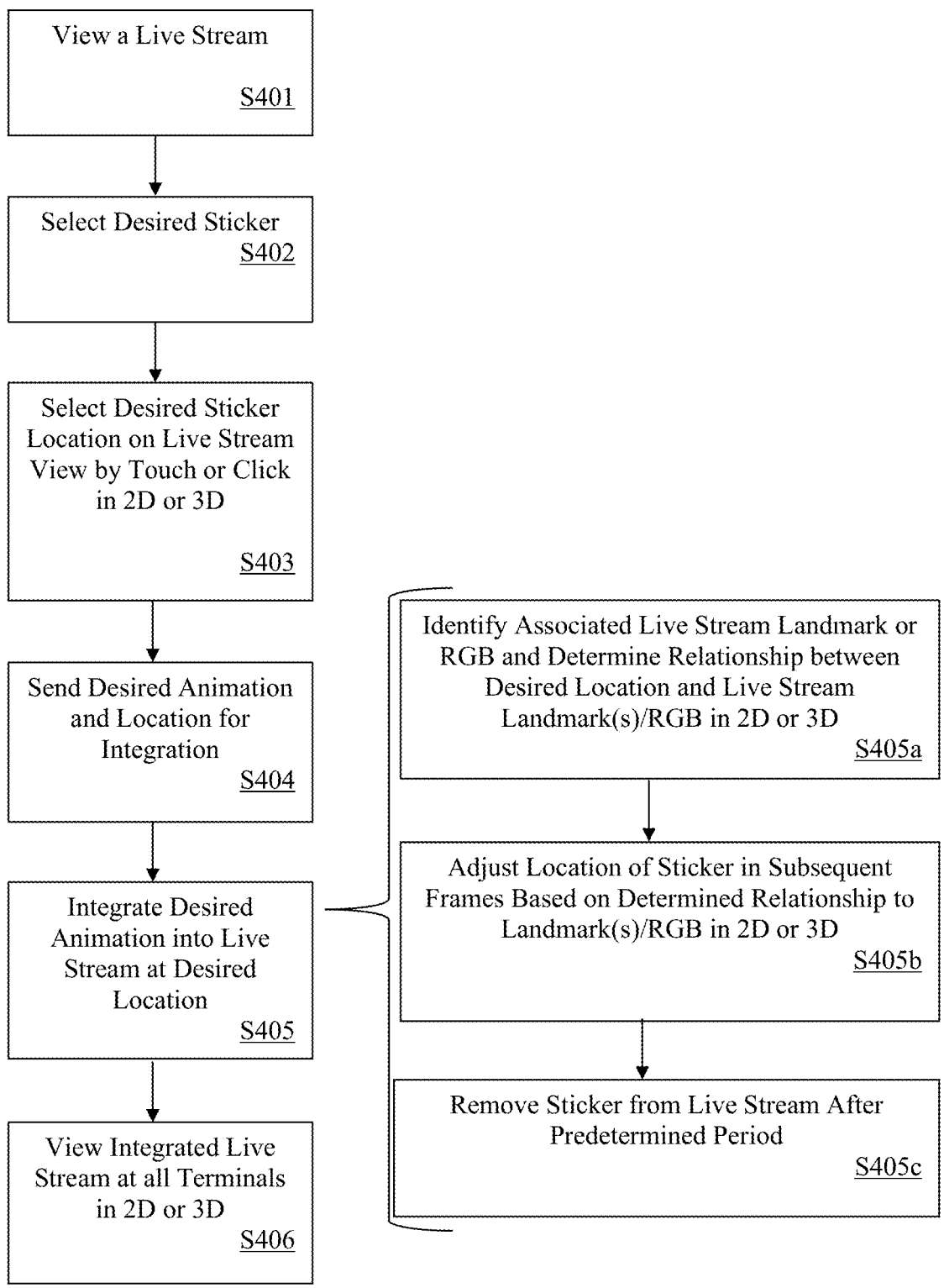
FIG. 4 is a flowchart illustrating an approach for controlling effects such as the placement of stickers on a live stream broadcast and controlling an accessory appearing within the frame of the live stream broadcast in accordance with exemplary embodiments of the present disclosure.

FIG. 2 is a schematic diagram illustrating a system for controlling effects such as the placement of stickers on a live stream broadcast and controlling an accessory appearing within the frame of the live stream broadcast in accordance with exemplary embodiments of the present disclosure. FIG. 4 is a flowchart illustrating an approach for controlling effects such as the placement of stickers on a live stream broadcast and controlling an accessory appearing within the frame of the live stream broadcast in accordance with exemplary embodiments of the present disclosure.

As can be seen from FIG. 2, the control server 14 may include a CPU 16 and memory 15 and may be connected to the Internet 13 so as to establish the above-described broadcast platform independent connection between the content creator terminal 11 and the viewer terminals 18*a*-18*d*. The content creator terminal 11 may be connected to a microphone (not shown) and a video camera 21, which may be a monocular 2D camera or a binocular 3D camera. The video camera 21 may capture a scene, for example, of the content creator model 12. The scene may also include one or more accessories, such as an adult stimulation device 22 (e.g., a sex toy) that is in wireless communication with the content creator terminal 11 for remote control, for example, over the Internet 13, by the viewers 12*a*-12*d*. The captured scene may be used to start one or more live streaming sessions hosted by one or more of the broadcast platforms 17*a* and 17*b*.

Each of the viewer terminals 18*a* and 18*b* may show the scene as part of the live stream hosted by the one or more of the broadcast platforms 17*a* and 17*b* (Step S401). The content creator terminal 11 may also show the scene so that the content creator model 12 may see what is being seen by the viewers 12*a*-12*d*.

The viewer terminals 18*a* and 18*b* may provide a control UI that is divided into sections with a first section, for example, displaying the live stream video and a second section showing, for example, a set of selectable stickers, which, as shown in FIG. 2, may include a mouth, a heart, and a lightning bolt, although these particular stickers are shown merely as an example. This second section may also show the viewer the details concerning each sticker, for example, how it appears, what tip might be necessary for making use of the sticker, and what effect the sticker might have on the image of the content creator model. Rolling over or tapping the icon for each sticker with a mouse or touch may animate the sticker icon to show the animation of the sticker or the icons may be perpetually animated. It is to be understood that these sections need not be separate and the functionality of each section may be combined into a single section or each section may appear as a scalable and movable window.

One of the viewers (e.g., 18a) may bring up the control user interface (UI) for placing a sticker on the scene. While the broadcast platform (e.g., 17a) may deliver the live stream to the viewer terminal 18a, the control server 14 may interact with the applications/browser plug-ins on the viewer device 18a and the content creator terminal 11 so as to manage the placement of the sticker over the scene. Thus, the control UI may be provided by the application/browser plugin, which may connect to the live stream on behalf of the user 12a.

Using the control UI, the user 12a may select from one of a set of available stickers (Step S402) and also select a location on his view of the scene for the placement of the sticker (Step S403). This may be performed, for example, by a drag-and-drop process where an icon representing the desired sticker is dragged from the set of available stickers and released in the desired location on the scene view of the viewer terminal 18a.

The application/browser plug-in running on the viewer terminal 18a may determine the sticker selected and the desired location and relay this information back to the control server 14 which may send it to the application/browser plug-in running on the content creator terminal 11 (Step S404) for integration into the live stream (Step S405) such that not only do viewers using the application/browser plug-in see the sticker but so to do the viewers who are not using the application/browser plug-in and are only in communication with the broadcast platforms 17a and 17b and not the control server 14 (Step S406). The content creator model 12 may even see the sticker applied to the scene within her content creator terminal 11. The control server 14 or the application/browser plug-in running on the content creator device 11 may be responsible for translating the information pertaining to the location of the sticker on the viewer terminal 18a to a corresponding location on the live stream so as to have the sticker appear in a correct location relative to the images captured within the scene.

It is noted that while this process may be performed either in 2D or 3D, the sticker may also have both a 2D and 3D structure. Where the sticker is in 2D, the viewer may select both its location and planar rotation. Where the sticker is in 3D, the viewer may select its location in 3D space and its orientation in 3D, for example, by the setting of a solid angle for the sticker to face. Where the sticker is set in 3D and a viewer views in 2D, the viewer may see a 2D projection of the 3D sticker. Where the sticker is set in 2D and the viewer views in 3D, an arbitrary or default 3D orientation may be established.

It is further noted that where the viewer is interacting in 3D, the viewer terminal may be a set of 3D glasses or goggles and the interaction may be performed with the use of a hand controller or the like, such as is used by the Meta Quest 2, marketed by META PLATFORMS.

The sticker may be added to the live stream scene using an application such as OBS Studio, which is a program for creating live stream audio video feeds in which the sticker may be added as a layer on top of the captured scene video. Other applications may alternatively be used for this purpose, particularly where the captured scene video and sticker are in 3D.

The ability to bring up the control UI and apply a sticker to the scene may be gated by the providing of a tip from the user 12a to the content creator 12. This tip may be transacted either by the broadcast platform or the control server 14. However, where the tip is transacted by the broadcast platform, information pertaining to the tip given may be sent to the control server 14 by the application/browser plug-in running on the content creator terminal 11 which may see the tip come in and report the same to the control server 14 so that the use of the control UI to place the sticker may be allowed. The control server 14 and/or the application/browser plug-in running on the content creator terminal 11 may be responsible to determining the sufficiency of the tip to access this gated feature. The ability of the viewer 12a to remotely control the accessory 22 may be similarly gated.

The gating of the sticker is not necessarily limited to the provision of a tip. The gating may additionally require that a tip of a predetermined level be transacted. Alternatively, the ability to apply a sticker may be granted to a viewer that provides a highest tip from among the several tips of a plurality of viewers. The gating need not be limited exclusively to the performance of a single tipping function and, according to one exemplary embodiment of the present disclosure, the ability to apply a sticker may be granted to a user who is determined to be a "big fan" which might be based on cumulative tipping history and/or a length of time spent browsing the live feeds and/or prerecorded content of the content creator model.

It is to be understood that the sticker may persist for a number of frames and it is therefore likely that the content creator model and/or some other object or subject that the sticker was selected to be adjacent to or on top of may change location in one or more directions and/or change orientation. Thus, for as long as the sticker persists, exemplary embodiments of the present invention may track the sticker to a particular anatomical landmark of the frame, which may be, for example, part of the content creator model. This may be done using computer vision techniques to segment the scene and identify one or more distinct objects/subjects within the scene and then segment the object/subject by identifying anatomical landmarks such as parts of a body and establishing a spatial relationship to one or more of such anatomical landmarks (Step S405a), from frame to frame, in 2D or 3D, to keep the sticker at the desired spatial relationship regardless of how the object/subject moves from frame to frame (Step S405b).

In some exemplary embodiments of the present disclosure, the UI for applying the sticker may include overlaying, on the displayed video image, various prompts suggesting or dictating locations where the viewer may place stickers.

Alternatively, rather than performing segmentation, RGB values of pixels/voxels of the selected sticker location may be identified and tracked from frame to frame so as to adjust the position of the sticker from frame to frame to try to keep its relationship to the selected set of RGB pixel/voxel values.

The control server 14 and/or the application/browser plug-in running on the content creator terminal 11 may additionally be responsible for performing this tracking of the sticker to the anatomical landmark of the scene.

As the sticker may be designed to persist only for a limited amount of time, after the time has elapsed, the sticker may be removed from the scene (Step S405c).

According to some exemplary embodiments of the present disclosure, in addition to superimposing the sticker over the live stream video, the live stream video may be modified to represent an effect of the sticker that has been selected. For example, as mentioned above, the sticker may be a tongue licking, a whip snapping, wax melting, etc. In such instances, the location near the spot where the sticker is applied may be analyzed to determine if it is a part of a human body that may have a reaction to the type of sticker applied thereto. For example, a licking sticker may impart wetness, a whip sticker may impart redness, wax melting may similarly impart redness but with wax drippings. The part of the human body effected by the application of the sticker may also exhibit deformation, shaking, etc. that would be commensurate with the type of stimulus provided by the sticker.

Various AI techniques may be used for modifying the real-time video so as to exhibit the desired effects such as those discussed above. In this way, the level of interactivity between viewer and model may be enhanced. For example, AI may be used to create coloring upon the portion of the model's body that received a sticker, such as a slapping hand sticker. The coloring may be calculated based on the skin tone of the model's body so as to create a natural looking flush for that model. This coloring may also be dependent upon a portion of the model's body upon which the sticker was received so as to create a more natural looking reaction that takes into account the appearance of the model, the location upon the model's body that is affected by the sticker, and the nature of the sticker, i.e., what sort of action the sticker is representing. Similarly, AI may be used to create a realistic looking deformation and/or shaking of the affected portion of the model's body that also takes into consideration the appearance of the model, the location upon the model's body that is affected by the sticker, and the nature of the sticker.

The AI used may detect and tag various anatomical landmarks upon the image of the model and each sticker may be associated with various deformation and coloring instructions that are anatomically dependent. The deformation and coloring instructions may then be applied to the live stream of the model in real-time in association with the display of the sticker so as to create a realistic looking special effect that is associated with the activity of the sticker.

It is to be understood that the selection and application of a sticker to a video is distinguished from providing a user control over playing, pausing, resuming from pause, speeding up, slowing down, adjusting brightness/volume of a video as these changes only apply to the viewing of the video, while the applying of the sticker adds to the content of the video and is visible by other people watching the video and/or visible on subsequent viewings of the video. Thus, applying the sticker is different from simply adjusting video playing parameters such as those listed above.

While the disclosure above discusses the application of stickers to a live stream video feed, it is to be understood that a user may similarly apply a sticker to a prerecorded video and the various elements described above may be used to add the effects of the sticker to that prerecorded video. The selected sticker effects may be incorporated into the video and subsequent viewings of that video, by the user who placed the sticker and/or by other users, may then include the sticker effects.

Figure 3:
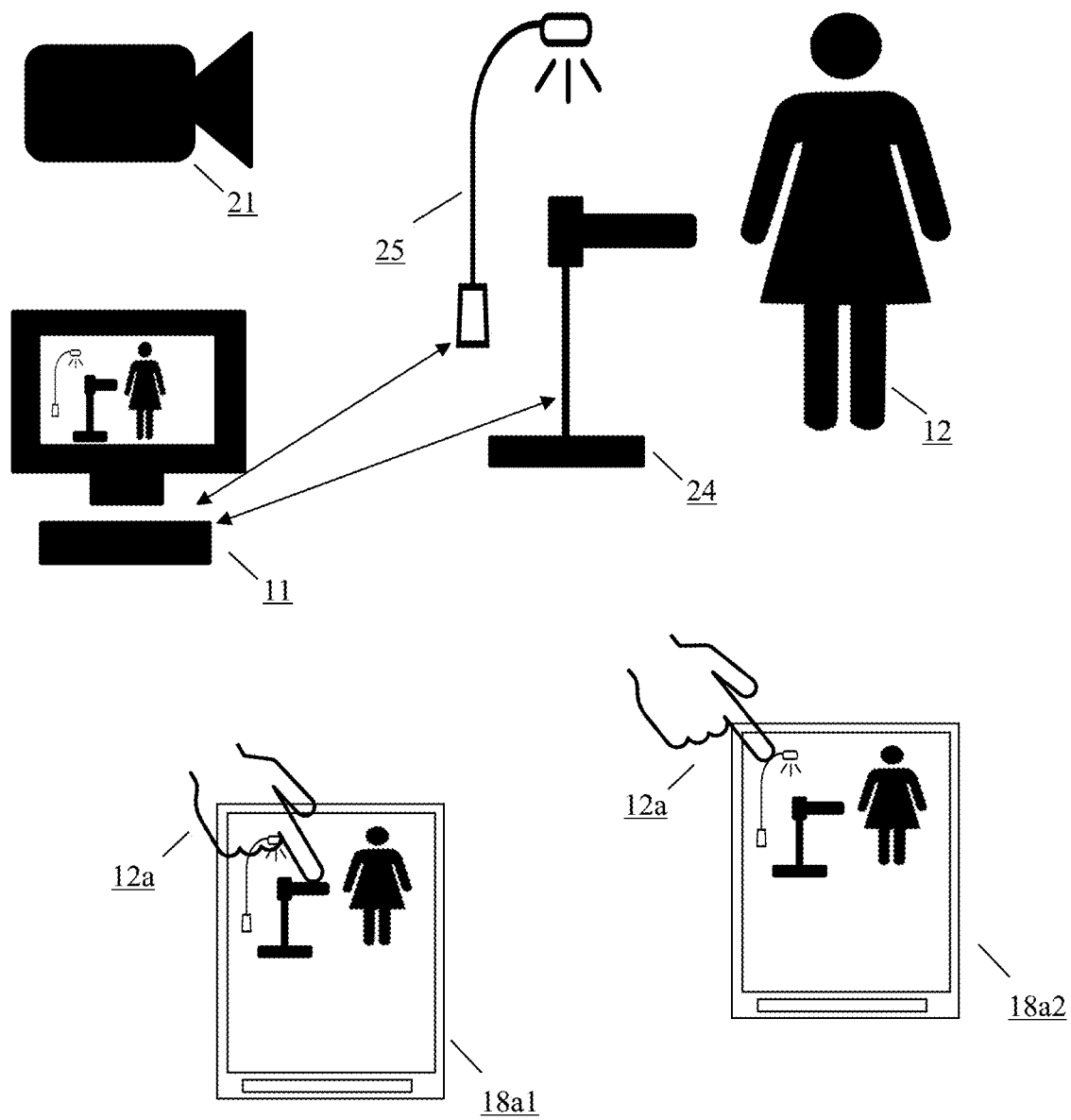
FIG. 3 is a schematic diagram illustrating a system for controlling accessories appearing within the frame of the live stream broadcast in accordance with exemplary embodiments of the present disclosure.
Figure 5:
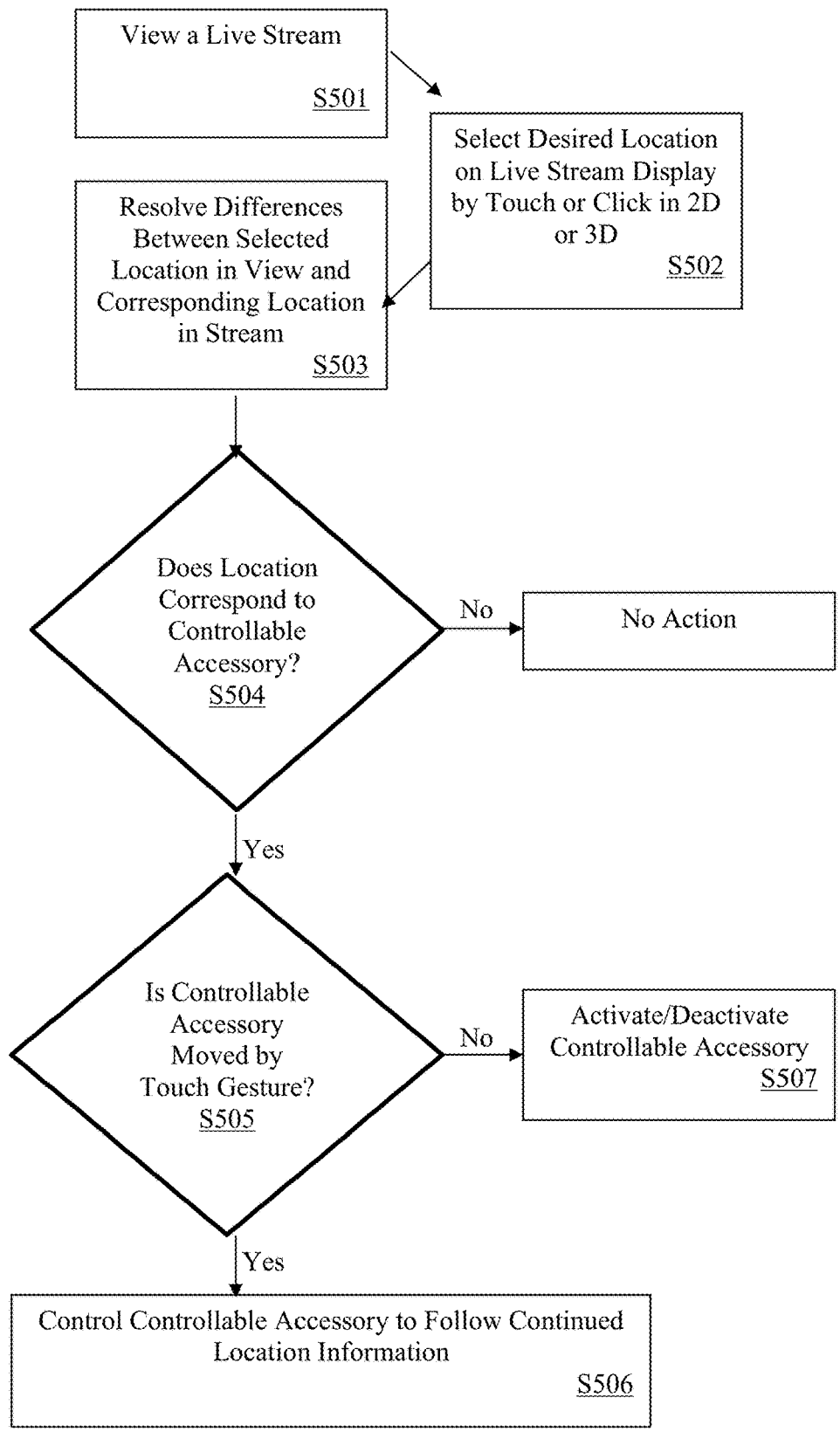
FIG. 5 is a flowchart illustrating an approach for controlling accessories appearing within the frame of the live stream broadcast in accordance with exemplary embodiments of the present disclosure.

FIG. 3 is a schematic diagram illustrating a system for controlling accessories appearing within the frame of the live stream broadcast in accordance with exemplary embodiments of the present disclosure. FIG. 5 is a flowchart illustrating an approach for controlling accessories appearing within the frame of the live stream broadcast in accordance with exemplary embodiments of the present disclosure.

As can be seen from FIG. 3, in addition to the content creator model 12, a first accessory 24 and a second accessory 25 may appear within a scene of a live stream that is being viewed (Step S501). The first accessory 24 may be a sex machine, which is a device that incorporates a sex toy and a shaft capable of reciprocating force. The second accessory 25 may be a light that may be capable of being turned on and off, as well as providing one or more additional operational modes such as providing a strobing effect or producing a desired color.

The accessories 24 and 25 may be connected to the content creator terminal 11, for example, by a wired or wireless connection such as USB cable or Bluetooth. The application/browser plug-in running on the content creator terminal 11 may register the connected accessories for remote control by one or more viewers. The remote control may be gated as described above. The application/browser plug-in running on the content creator terminal 11 may understand the functionality of the various accessories that have been registered so as to provide an appropriate control UI to the viewers. The viewer 12a may control the accessories through the control UI running on the viewer terminal 18a1 to touch the image of desired accessory 24 (Step S502) and then manipulate the desired accessory 24 by a gesture that represents the action being performed by the accessory. For example, the viewer 12a may contact the tip of the sex machine and direct the motion of the reciprocating shaft and the user terminal 18a1, the control server 14, or the applications/browser plug-ins may interpret the particular accessory being touched and the nature of the control being applied thereto by the touch gesture of the user so that the sex machine 24 may be precisely controlled to match the degree of extension represented by the touch gesture of the user 12a. In this way, the user 12a may have the experience of directly controlling the degree of extension and/or reciprocating speed of the sex machine 24 to influence the scene in the desired way.

Where the accessory is a lamp 25, the viewer 12a may tap the image of the lamp 25 in the scene displayed on the viewer terminal 18a2 and by that tap, the lamp may be controlled to turn on/off. More generally, the accessory may be any remote controllable or smart home device that can be connected to the content creator terminal 11 and registered within the application/browser plug-in running thereon. The manner of the touch gesture may be interpreted into an accessory command such that the accessory behaves as if the viewer had actually touched the accessory in the location and manner that the viewer touched the image of the accessory.

As described above, however, there may be some differences between a coordinate system of the live stream being viewed on the viewer terminal and a coordinate system of the live stream source. These differences may therefore be resolved (Step S503) prior to implementing accessory control. Here, the location selected by the viewer on the viewer terminal may be transformed to the coordinates of the live stream for comparison, or the coordinates of each may be transformed to some invariant coordinate system.

After the location of the touch has been resolved, it may next be determined whether the touched location corresponds to a controllable accessory (Step S504). This step may be seen as determining whether the resolved location of the touch corresponds to a range of positions of a model accessory within the live stream video feed.

To perform this feature, the location of the accessories within the scene, in 2D or 3D, would first be determined. This may be performed by either the application/browser plug-in running on the content creator terminal 11, the application/browser plug-in running on the viewer terminal 18, but perhaps most likely by the control server 14. The responsible device may receive the video stream and analyze the scene to identify the location of the one or more registered accessories based on appearance using computer vision techniques. An image of each accessory may be provided during accessory registration. Alternatively, each accessory may utilize a QR code or similar marking which identifies the accessory within the scene. The QR code may be applied to the accessory on one or more sides thereof so as to be seen from various angles.

Figure 9:
FIG. 9 represents a control UI for allowing the content creator to define accessory control in accordance with exemplary embodiments of the present disclosure.

The content creator model may be responsible for determining where within a scene the controllable accessory resides using a control UI. FIG. 9 represents a control UI for allowing the content creator to define accessory control in accordance with exemplary embodiments of the present disclosure. The content creator may use this UI to dive the scene into a grid, using a desired number of grid boxes, as shown in FIG. 9, and then identify which grid squares include the controllable accessories.

After the location of each accessory has been determined, either automatically or by the selections of the content creator, the selection, by the user, within a grid point of a controllable accessory may invoke accessory control. For example, the lamp may be located within the $5^{th}$ grid, as shown, and then the user tapping into the $5^{th}$ grid may activate the lamp. The content creator may be offered, through the control UI, the opportunity to set the number of boxes within the grid (e.g., 4 boxes, 12 boxes, etc.) so as to set the necessary level of fineness so as to control the various controllable accessories. The content creator may also use this UI to set a required tip needed to access each controllable accessories and/or to define what tip may be needed to invoke what functionality of the accessory. The content creator may further utilize this UI for testing the control of an accessory by placing the accessory within the desired grid square and then determining if the accessory is appropriately controlled by the desired user press.

If the selected location does not correspond to a controllable accessory (No, Step S504), then no action need to be taken. If, however, the selected location does correspond to a controllable accessory (Yes, Step S504), then the control capabilities of the selected accessory may be determined. For example, it could be that a simple touch is enough to activate or deactivate the accessory. Alternatively, it could be that a touch gesture is used to control how the accessory moves. Accordingly, after it is determined that an accessory has been touched, it is then determined whether the accessory is controlled in its motion by a touch gesture (Step S505). If its movement is not controlled by a gesture (No, Step S505) then it will be determined that the touch constitutes an activation/deactivation and the appropriate control will be sent to the accessory (Step S507). If, however, it is determined that the accessory is controlled in its motion by a touch gesture (Yes, Step S505), then the touch gesture is interpreted and it is used to control the movement of the accessory so that the accessory follows the continued movement of the viewer's touch gesture (Step S506). The viewer may also see a word balloon appear over the position of the controlled accessory within his view, the word balloon confirming the activation of the accessory in the desired manner.

Interpretation of the touch gesture may be performed by analyzing whether the touch gesture is a simple touch (e.g., a tap) or a specialized gesture (e.g., a drag) and then each gesture may be interpreted as one or more control instructions for the associated accessory. For example, a lamp may be turned on or off by a simple touch while a sex machine may be extended to a desired extent or a robot toy, such as a remote controlled car or drone, may be controlled in correspondence with the continued touch of the viewer.

At the time of registering the accessory, an accessory driver may be installed to the content creator terminal 11 and this accessory driver may inform the content creator terminal 11 and the application/browser plug-in therein: how to identify the accessory within the frame (e.g., in terms of content creators' pre-configuration setting, appearance recognition, QR code, and etc.), how to communicate with the accessory, and how to control the various operative modes of the accessory. This information is used by the content creator terminal 11 to pass appropriate instructions on to the accessory in response to the viewer's touch command.

Figure 6:
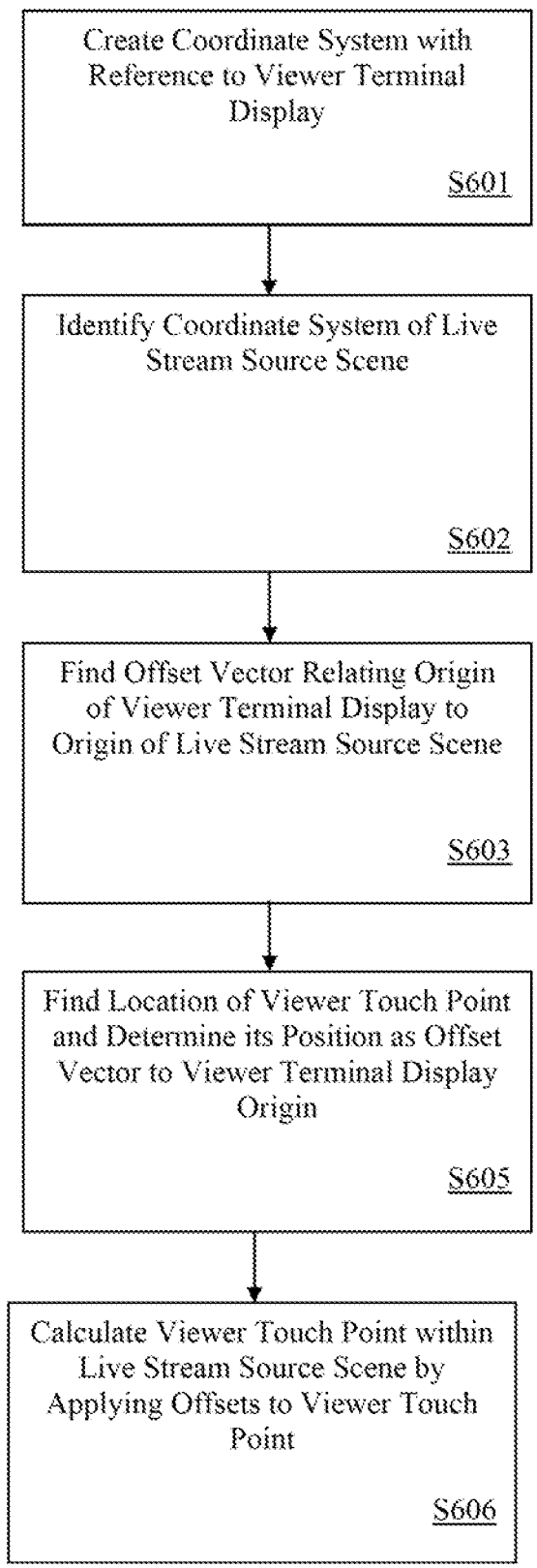
FIG. 6 is a flowchart illustrating an approach for location resolution in accordance with exemplary embodiments of the present disclosure.
Figure 7:
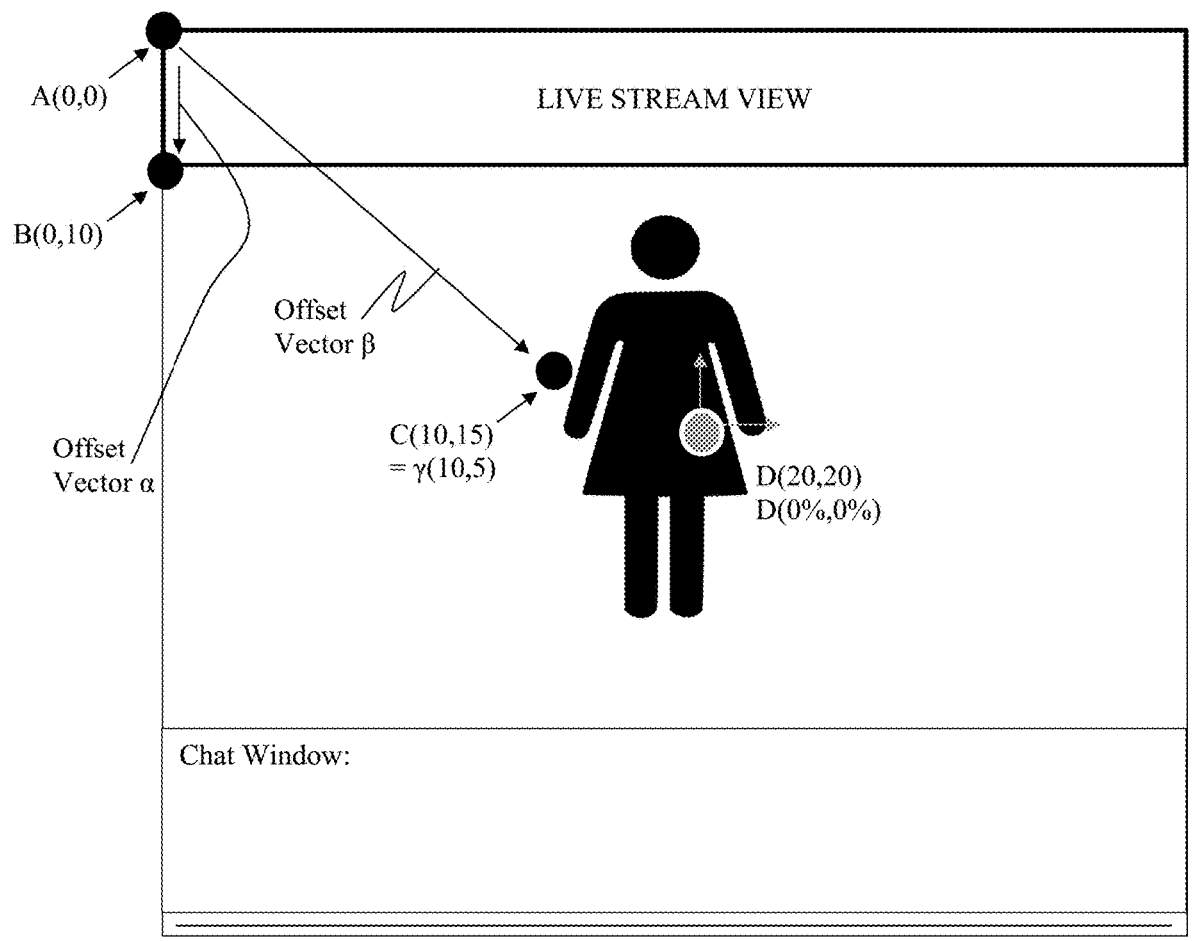
FIG. 7 is an exemplary image showing resolution of a location of a touch of a viewer on a viewer terminal to a location of the live stream video source in accordance with exemplary embodiments of the present disclosure.

It has been described above that as the touch of the viewer at a particular location on the screen of his viewer terminal may correspond with the position of an object or subject within a frame of a live stream. Exemplary embodiments of the present disclosure may provide an effective means of resolving a location of a touch of a viewer on a viewer terminal to a location of the live stream video source. FIG. 6 is a flowchart illustrating an approach for location resolution in accordance with exemplary embodiments of the present disclosure. FIG. 7 is an exemplary image showing resolution of a location of a touch of a viewer on a viewer terminal to a location of the live stream video source in accordance with exemplary embodiments of the present disclosure.

First, a coordinate system (X1,Y1) may be created with respect to the viewer terminal display (Step S601). Here, the upper left corner of the viewer terminal display may be designated as the coordinate system origin and may be referred to as point A. This location may be identified as A(0,0). This origin may be taken as the reference point. Next, an upper left corner of the live stream source scene may be identified as point B (Step S602). This location may be at B(0,10). An offset vector α may then be calculated as a difference between the origin A (i.e., the origin for the viewer terminal display) and point B (i.e., the origin for the live stream source scene), e.g., B(0,10). The offset vector α may thereby indicate an offset of the live stream source scene with respect to the viewer terminal display. Here, for example, the offset vector α may be $(\vec{0}, 1\vec{0})$ (Step S603).

Next, a viewer touch point within the viewer terminal is identified as point C and this point may be located at C(10,15). An offset vector β may be calculated as a difference between point C and the origin A. This offset vector β may be $(1\vec{0}, 1\vec{5})$ (Step S604).

Then, a coordinate γ may be calculated as the location of the touch point C within the live stream source scene (relative to point B rather than relative to point A). This may be accomplished by combining both offset vectors α and β, for example to arrive at γ(10,5) (Stet S605). In this way the touch point C within the viewer terminal display may be corresponded with the touch point γ within the live stream scene for the purposes of selecting a point to apply a sticker and/or control an accessory.

Next, a new coordinate system (X2,Y2) may be created. A center point of the live stream broadcast picture [Point D] is taken as another reference point. This Point D is the origin of the second coordinate system (X2,Y2). For example, Point D may be (0%,0%).

A proportional reference coordinate value may then be calculated based on a current click position (i.e., point C) relative to the center (i.e., point D (0%,0%)) of the live broadcast picture, according to the first coordinates of point C and point D as well as the length and width of the broadcast picture (Step S606). For example, the proportional/reference coordinate value may be calculated as (−50%,+50%).

Next, the reference coordinate value, e.g., (−50%,+50%) may be sent to the control server and then from there to the content creator terminal (e.g., the application or browser plugin running thereon).

Figure 8:
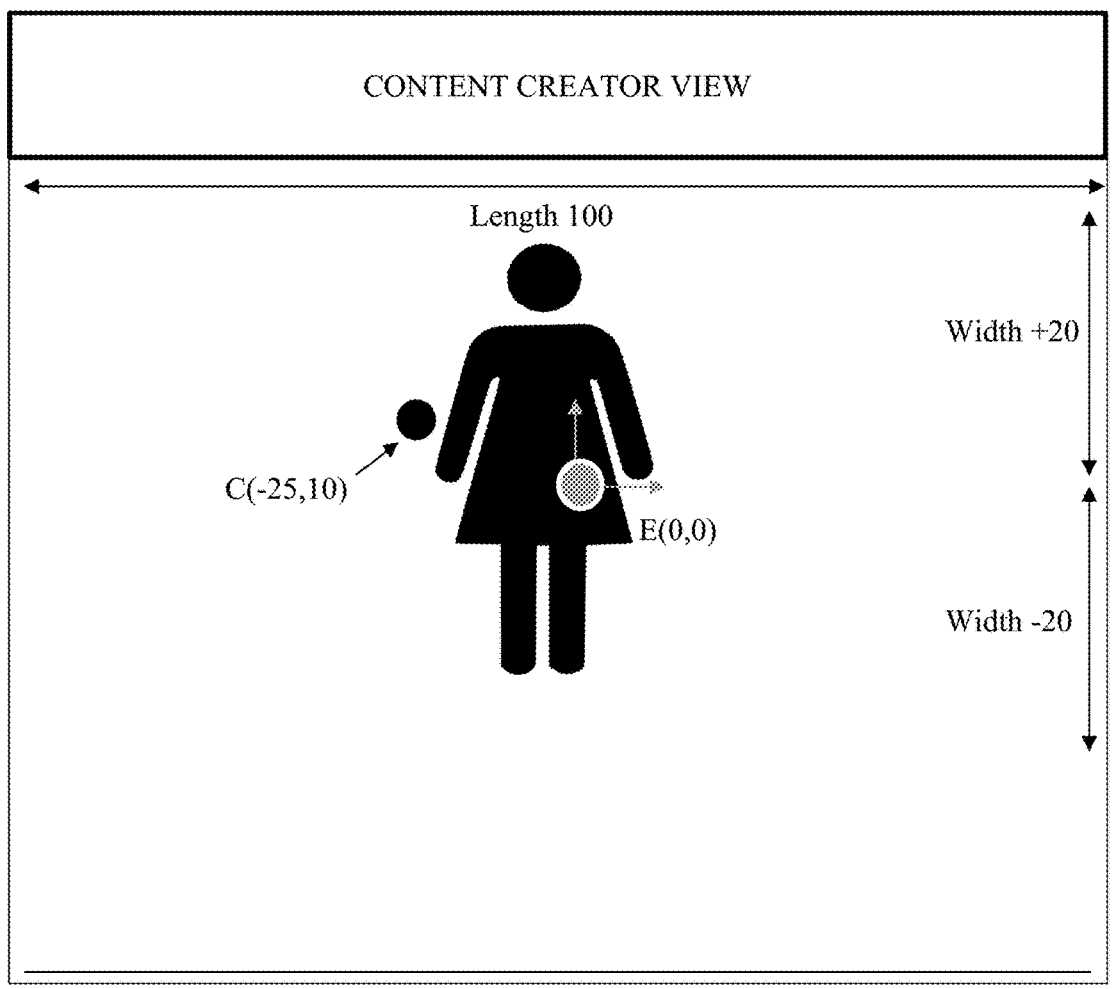
FIG. 8 is an exemplary image showing a location of a touch of a viewer on a content creator terminal in accordance with exemplary embodiments of the present disclosure.

At the content creator end, where the reference coordinate value is received, a third coordinate system (X3,Y3) may be created. FIG. 8 is an exemplary image showing a location of a touch of a viewer on a content creator terminal in accordance with exemplary embodiments of the present disclosure. A value of a length (e.g., 100) and a width (e.g., 40) for the broadcast picture may be received. The second position point C is reversely calculated according to the reference coordinate value (e.g., (−50%,+50%)) and the length (e.g., 100) and the width (e.g., 40). For example, the second position point C may be (−25,10), as shown. The generated effects of the sticker may then be rendered at the second position point C.

The sticker effects may be superimposed over the video camera feed of the content creator terminal at the second position point C using software for video overlaying such as OBS, as described above, and this superimposed video may be sent to the broadcast platform as the live video feed and/or to the control server, in either case, for the viewing by the viewers at the viewer terminals.

Figure 10:
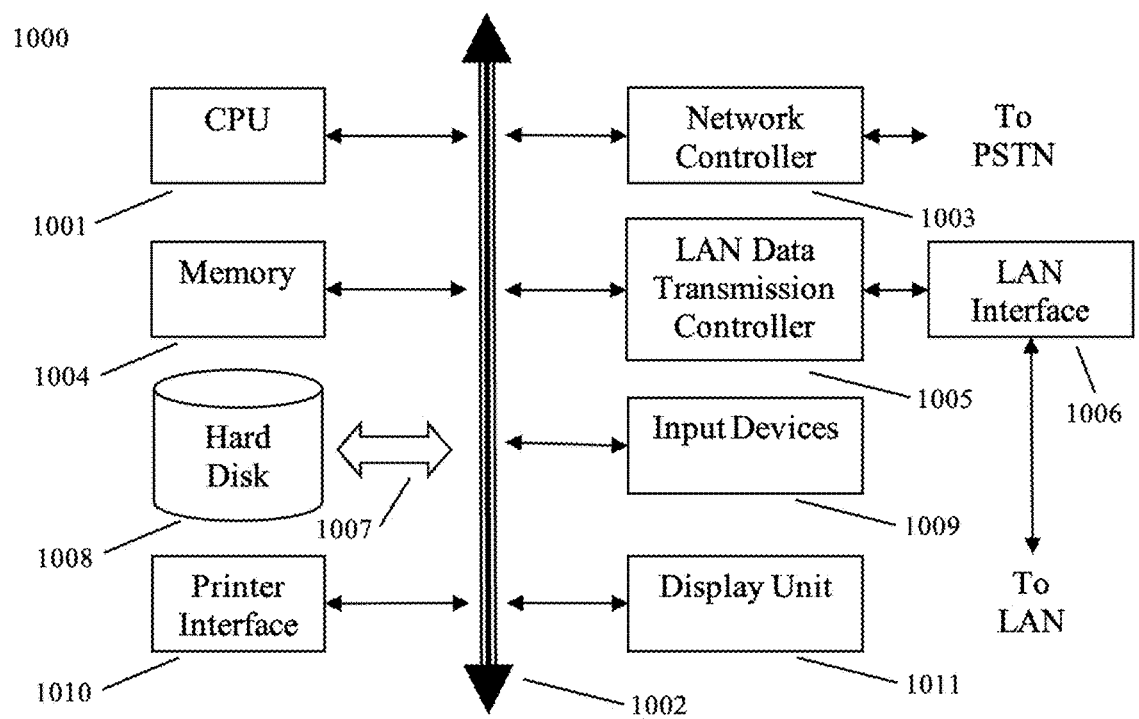
FIG. 10 shows an example of a computer system capable of implementing the method and apparatus according to embodiments of the present disclosure.

FIG. 10 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for controlling effects on a live video stream, comprising:
   receiving a content creator video image from a content creator device, incorporating the content creator video image into the live video stream, and displaying the live video stream on a first viewer device as a first device video image;
   receiving a selection of a sticker graphic on the first viewer device;
   determining a position of a user input operation on the displayed first device video image;
   converting the determined position of the user input operation on the displayed first device video image to a position of the user input operation on the live video stream;
   integrating the selected sticker graphic to the live video stream at the converted position of the user input operation on the live video stream; and
   displaying the live video stream integrated with the sticker graphic on at least the first viewer device.

2. The method of claim 1, wherein the live video stream integrated with the sticker graphic is displayed on the content creator device.

3. The method of claim 1, wherein the selected sticker graphic is selected from among a set of preprogramed sticker graphics.

4. The method of claim 1, wherein the selected sticker graphic is a recorded video or motion capture video that has been recorded on the first viewer device.

5. The method of claim 1, wherein the selected sticker graphic includes animation.

6. The method of claim 1, additionally comprising:
   displaying the live video stream integrated with the sticker graphic on a second viewer device.

7. The method of claim 1, wherein the selected sticker graphic is selected using a sticker graphic selection user interface that is rendered alongside the display of the live video stream on h first viewer device.

8. The method of claim 1, wherein the selection of the sticker graphic is performed by a user of the first viewer device using a touch gesture and the touch gesture is further used to customize a look, animation effect, and/or duration of the selected sticker graphic.

9. The method of claim 1, wherein the selected sticker graphic persists within the live video stream for a predetermined time duration or predetermined number of video frames.

10. The method of claim 1, wherein the selected sticker graphic maintains a relative position and/or orientation to a specific landmark of an object or subject within the live video stream from frame to frame by segmenting the live video stream to detect the specific landmark and then tracking a location of the specific landmark from frame to frame and adjusting the position of selected sticker graphic within the live video stream according to the tracked location of the specific landmark from frame to frame.

11. The method of claim 1, wherein an ability to select and place a sticker graphic is gated by a performance of a tipping operation of at least a predetermined value, by a performance of a greatest tipping operation from among a plurality of tipping operations, by a sufficient cumulative tipping history, and/or by a performance of having a highest browsing time from among a plurality of browsing times.

12. The method of claim 11, wherein after the ability to select and place a sticker graphic has been allowed by the gating, a user interface for selecting and/or recording a sticker graphic is provided to the first viewer device.

13. The method of claim 1, wherein an image of a body part of a subject model proximate to the applied sticker graphic within the live video stream is deformed in a manner consistent with a type of the applied sticker graphic.

14. The method of claim 13, wherein artificial intelligence (AI) software is used to deform the body part within the live video stream.

15. The method of claim 1 wherein a coordinate system of the live video stream is different from a coordinate system of the first device video image.

16. A system for controlling effects on a live video stream, comprising:
   a memory device having stored thereon a set of instructions;

a processor configured to execute said set of instructions to:

receive a content creator video image from a content creator device, incorporate the content creator video image into the live video stream, and display the live video stream on a first viewer device as a first device video image;

receive a selection of a sticker graphic on the first viewer device;

determine a position of a user input operation on the displayed first device video image;

convert the determined position of the user input operation on the displayed first device video image to a position of the user input operation on the live stream video:

integrate the selected sticker graphic to the live video stream at the converted position of the user input operation on the live video stream; and display the live video stream integrated with the sticker graphic on at least the first viewer device.

17. The system of claim 16, wherein the live video stream integrated with the sticker graphic is displayed on the content creator device.

18. The system of claim 16, wherein the selected sticker graphic is a recorded video or motion capture video that has been recorded on the first viewer device.

19. The system of claim 16, wherein an image of a body part of a subject model proximate to the applied sticker graphic within the live video stream is deformed in a manner consistent with a type of the applied sticker graphic.

20. The system of claim 19, wherein artificial intelligence (AI) software is used to deform the body part within the live video stream.

21. The system of claim 16 wherein a coordinate system of the live video stream is different from a coordinate system of the first device video image.

22. A non-transitory computer-readable storage medium, comprising:

machine-readable instructions, wherein the machine-readable instructions when executed by a processor of a controller, enable the controller to:

receive a content creator video image from a content creator device, incorporating the content creator video image into the live video stream, and display the live video stream on a first viewer device as a first device video image;

receive a selection of a sticker graphic on the first viewer device;

determine a position of a user input operation on the displayed first device video image;

convert the determined position of the user input operation on the displayed first device video image to a position of the user input operation on the live video stream;

integrate the selected sticker graphic to the live video stream at the converted position of the user input operation on the live video stream; and display the live video stream integrated with the sticker graphic on at least the first viewer device.

23. The non-transitory computer-readable storage medium of claim 22, wherein an image of a body part of a subject model proximate to the applied sticker graphic within the live video stream is deformed in a manner consistent with a type of the applied sticker graphic.

24. The non-transitory computer-readable storage medium of claim 23, wherein artificial intelligence (AI) software is used to deform the body part within the live video stream.

25. The non-transitory computer-readable storage medium of claim 22 wherein a coordinate system of the live video stream is different from a coordinate system of the first device video image.

* * * * *